US012655294B2

(12) United States Patent
Merzlic et al.

(10) Patent No.: US 12,655,294 B2
(45) Date of Patent: Jun. 16, 2026

(54) THERMOPLASTIC ELASTOMER-SILICONE COMPOSITION

(71) Applicant: ARKEMA FRANCE, Colombes (FR)

(72) Inventors: Sebastien Merzlic, Serquigny (FR); Philippe Blondel, Serquigny (FR); Florent Abgrall, Serquigny (FR); Karine Loyen, Serquigny (FR); Damien Rauline, Serquigny (FR); Sebastien-Jun Mougnier, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 0 days.

(21) Appl. No.: 18/509,456

(22) Filed: Nov. 15, 2023

(65) Prior Publication Data

US 2024/0084140 A1 Mar. 14, 2024

Related U.S. Application Data

(62) Division of application No. 16/961,984, filed as application No. PCT/FR2019/050075 on Jan. 15, 2019, now abandoned.

(30) Foreign Application Priority Data

Jan. 15, 2018 (FR) ........................................ 1850303

(51) Int. Cl.
*C08L 87/00* (2006.01)
*C08J 3/20* (2006.01)

(52) U.S. Cl.
CPC ............ *C08L 87/005* (2013.01); *C08J 3/201* (2013.01); *C08L 2203/20* (2013.01); *C08L 2205/02* (2013.01); *C08L 2205/03* (2013.01); *C08L 2205/035* (2013.01); *C08L 2205/08* (2013.01); *C08L 2207/04* (2013.01)

(58) Field of Classification Search
CPC .... C08G 69/40; C08G 77/448; C08G 77/458; C08L 23/0846; C08L 23/0869; C08L 23/0884; C08L 23/147; C08L 23/26; C08L 2205/03; C08L 2205/035; C08L 2205/08; C08L 2207/04; C08L 77/12; C08L 87/005
See application file for complete search history.

(56) References Cited

U.S. PATENT DOCUMENTS

| | | | | |
|---|---|---|---|---|
| 5,399,599 A | 3/1995 | Guillot | | |
| 5,672,400 A | 9/1997 | Hansen | | |
| 7,166,656 B2 * | 1/2007 | Majumdar | C08K 9/08 524/505 | |
| 2002/0006998 A1 | 1/2002 | Furukawa | | |
| 2002/0018866 A1 | 2/2002 | Lee | | |
| 2015/0025197 A1 | 1/2015 | Garois | | |
| 2019/0060845 A1 | 2/2019 | Yang et al. | | |
| 2019/0225802 A1 | 7/2019 | Schaefer | | |

FOREIGN PATENT DOCUMENTS

| | | | | |
|---|---|---|---|---|
| CN | 104277322 A | 1/2015 | | |
| CN | 106750251 A * | 5/2017 | B01D 53/02 | |
| CN | 107298825 A * | 10/2017 | | |
| DE | 3714267 A1 * | 11/1988 | | |
| WO | 2018/065072 A1 | 4/2018 | | |

OTHER PUBLICATIONS

CN-107298825-A (Oct. 27, 2017) machine translation.*
DE-3714267-A1 (Nov. 10, 1998) machine translation.*
CN-106750251-A (May 31, 2017) machine translation.*
Pebax, "Big Chemical Encyclopedia", Product Pebax Pebas Grilamid Ely 60 Siltem . . . [p. 19], 3 pages., 2019.
Office Action (English translation only) mailed on Aug. 30, 2023, by the Korean Intellectual Property Office for Korean Application No. 10-2020-7023301, 5 pages.
Second Office Action with English translation mailed on May 27, 2023, by the China National Intellectual Property Administration for Chinese Application No. (2019800085503.9). 10 pages.
Mohammad Ali Semsarzadeh et. Al. "Preparation and Characterization of Polyurethane-Polydimethylsiloxane/Polyamide, 12-b-Polyteramethylene Glycol Blend membranes for Gas Separation", Iranian Journal of Polymer Science & Technology (Persion), Iran, vol. 26, No. 4, Nov. 24, 2013 (Nov. 24, 2013), pp. 337-348.
M.P. Drupitha et al., Compatibilized TPU-PDMS blends: Pros and cons of melt mixing and solution mixing techniques: "Journal of Applied Polymer Science" vol. 134, No. 31, Apr. 19, 2017 (2017-04-190), p. 25164.

* cited by examiner

*Primary Examiner* — Ana L. Woodward
(74) *Attorney, Agent, or Firm* — Boone IP Law

(57) ABSTRACT

A composition including: (A) a copolymer having rigid blocks and flexible blocks (TPE), (B) a non-crosslinked polysiloxane silicone, preferably a non-crosslinked polyorganosiloxane, (C) a compatibilizer, improving the compatibility between the TPE and the silicone, the compatibilizer (C) being chosen from a polyolefin or a mixture of polyolefins, and optionally (D) an additive.

24 Claims, No Drawings

THERMOPLASTIC ELASTOMER-SILICONE COMPOSITION

CROSS REFERENCE TO RELATED APPLICATIONS

The present application is a divisional of U.S. application Ser. No. 16/961,984, filed on Jul. 14, 2020, which is a U.S. national stage of International Application No. PCT/FR2019/050075, filed on Jan. 15, 2019, which claims the benefit of French Application No. 1850303, filed on Jan. 15, 2018. The entire contents of each of U.S. application Ser. No. 16/961,984, International Application No. PCT/FR2019/050075, and French Application No. 1850303 are hereby incorporated herein by reference in their entirety.

TECHNICAL FIELD

The present invention relates to thermoplastic elastomer polymer-silicone compositions and to articles manufactured from these compositions.

TECHNICAL BACKGROUND

Thermoplastic elastomer polymers (TPEs), such as thermoplastic polyurethanes (TPUs) or copolymers having polyamide blocks and polyether blocks (PEBAs), are used in various applications, such as sports, electronics, optics, motor vehicles and household electrical appliances. Their typical hardness is from 25 to 80 Shore D. Their main advantages are their processability (that is to say, ease of use in injection molding and extrusion), their elastomeric mechanical properties, their high resilience, their good impact strength and their low density.

However, existing TPEs have certain limitations: it is not possible to target a hardness (in Shore D) less than 25 Shore D, that is (in Shore A) a hardness of less than 80 Shore A, while retaining good processability, especially in injection molding; the exudation of low molecular weight components is observed, in particular for the flexible grades, with a high content of flexible polyether blocks, in particular due to the limited compatibility between the hard polyamide blocks and the flexible polyether blocks; they exhibit a limited abrasion resistance; they exhibit a low chemical resistance to oily components, such as sebum; they exhibit a limited resistance to soiling, that is to say to the transfer of color resulting from an external product; they have limited thermomechanical resistance; their haptic properties are not entirely satisfactory.

In contrast, silicone-based materials are generally used in mass consumption applications due to a number of advantages:

- low hardness (<80 Shore A);
- good haptic properties;
- good chemical resistance, in particular to sebum;
- good thermomechanical properties.

Their processability is their main disadvantage, because of the long cycle times required. Their mechanical properties (tear strength, abrasion resistance) arc limited. In addition, their bonding, or their compatibility with other thermoplastics is generally weak or requires the use of a primer or a compatibilizer.

There thus exists a need for polymer systems without the various disadvantages mentioned above, for the manufacture of a material exhibiting a good compromise between:

- the flexibility and durability of the TPE material: abrasion resistance and tear strength, chemical resistance and mechanical strength which are sufficient for repeated everyday use, and
- the attractiveness and the soft and silky feel (in particular "peachskin"), expected by the users.

The present invention is targeted at at least some, indeed even most, of the following properties, the measurement standards for which are specified below in table 2 of this description:

| | |
|---|---|
| Hardness, instantaneous (Shore A) | <80 |
| Hardness, 15 s (Shore A) | <75 |
| Tensile tests, stress at 25% strain (MPa) | <2.0 |
| Tensile test, stress at 100% strain (MPa) | <4.0 |
| Tensile test, breaking stress (MPa) | >10 |
| Tensile test, elongation at break (%) | >500 |
| Flexural modulus (MPa) | < or =12 |
| Tear strength (kN/m) | >40 |
| Taber abrasion resistance - H18 grinding wheel (weight loss in mg/1000 revolutions) | <50 |
| Taber abrasion resistance - CS10 grinding wheel (weight loss in mg/1000 revolutions) | |
| Compressive residual strain at 23° C. (%) | <20 |
| Ease of processing, and of removal from the mold. | |
| Recyclability | |
| Density | <1.00 |
| Resistance to exudation | |
| Chemical resistance (including sebum) | |
| Resistance to stains and soiling. | |

SUMMARY OF THE INVENTION

A subject matter of the present invention is thus a composition comprising:

- (A) a copolymer having rigid blocks and flexible blocks (TPE),
- (B) a non-crosslinked silicone, that is to say polysiloxane, such as linear polydimethylsiloxane, preferably a polyorganosiloxane,
- optionally (C) a compatibilizer, improving the compatibility between the TPE and the silicone, and advantageously chosen from a polyolefin or a mixture of several polyolefins.

Advantageously, said rigid blocks comprise at least one block chosen from: polyamide, polyurethane, polyester and their copolymers. Advantageously, said flexible blocks comprise at least one block chosen from: polyether, polyester, polysiloxane, polyolefin, polycarbonate and their copolymers.

Preferably, the block copolymer is chosen from copolymers having polyester blocks and polyether blocks, copolymers having polyurethane blocks and polyether blocks and copolymers having, polyamide blocks and polyether blocks, and preferably it is a copolymer having polyamide blocks and polyether blocks.

According to one embodiment, the ratio by weight of TPE (A) with respect to the silicone (B) is from 10:90 to 95:5, preferably 50:50 to 90:10, indeed even better still from 60:40 to 85:15.

Preferably, the composition of the invention comprises, by weight:

- from 55% to 95% of copolymer (A), preferably from 60% to 80%,
- from 5% to 45% of silicone (B), preferably from 10% to 40%, optionally from 0% to 45% of compatibilizer (C), preferably from 5% to 30%, from 0% to 15% of additives (D), preferably from 0.1% to 10%, with regard to the total weight of the composition, this being 100%.

The percentage by weight of silicone is thus fixed in order to improve the abrasion resistance, feel and soiling resistance properties of the product. This solution also makes it possible to eliminate the phenomena of exudation observed with regard to the most flexible TPEs and to facilitate the use of the product, the silicone limiting the adhesion of the mixture to metal walls.

According to one embodiment, the flexible blocks are polyether blocks in the copolymer (A), and are preferably polytetramethylene glycol blocks.

According to one embodiment, the rigid blocks are polyamide blocks in the copolymer (A), and are preferably PA 11 or PA 12 blocks.

According to one embodiment, the number-average molar mass Mn of the flexible blocks, in particular polyether blocks, is greater than 800 g/mol, preferably greater than 1000 g/mol, preferably greater than 1200 g/mol, preferably greater than 1400 g/mol, preferably greater than 1600 g/mol, preferably greater than 1800 g/mol and preferably greater than or equal to 2000 g/mol.

Advantageously, the ratio by weight of the rigid blocks, in particular polyamide blocks, to the flexible blocks, in particular polyether blocks, in the copolymer (A) is less than or equal to 1.2, preferably less than or equal to 1, preferably less than or equal to 0.8 and preferably less than or equal to 0.5.

According to one embodiment, the composition of the invention additionally comprises one or more additives (D).

The invention also relates to a process for the manufacture of the above composition, comprising the production of the mixture of at least one block copolymer (A) and of a non-crosslinked silicone. According, to one embodiment, the process is carried out in a device for mixing in the molten state, preferably in a twin-screw extruder, preferably at a temperature of the order of 150° C. to 250° C., preferably 160° C. to 220° C.

The invention also relates to an article comprising at least one part having a composition in accordance with the present invention.

According to one embodiment, the article is manufactured by a manufacturing process involving a stage of injection molding, overmolding, extrusion or co-extrusion of the composition according to the invention.

The applications of the composition according to the invention advantageously comprise fast-moving consumer products containing a flexible part exposed to daily wear and tear (footwear, interior decorative parts in motor cars), a part in regular contact with the skin (glasses, medical, electronics) or industry (conveyor belts).

According to one embodiment, the article is an electrical or electronic article comprising a casing or protective casing manufactured from the composition according to the invention, said article preferably being a portable computer, a portable telephone or a tablet.

The present invention makes it possible to overcome the disadvantages of the prior art. In particular, the invention provides compositions combining the advantageous properties of TPEs and silicones and in particular:

good formability (in injection molding and extrusion), elastomeric mechanical properties, high resilience, low density, low hardness, good abrasion resistance, good compressive properties, good haptic and esthetic properties;

good chemical resistance, in particular to sebum;

high thermomechanical properties;

good properties of adhesion to other materials, such as polyamides, including polyamides mixed with fillers, such as glass fibers, polyether-block-amides (PEBAs), copolyetheresters (COPES), thermoplastic polyurethanes (TPUs), polycarbonate (PC), ABS and PC/ABS.

This is achieved by providing a thermoplastic elastomer in the form of a composition according to the invention, based on TPE, preferably based on PEBA, and on non-crosslinked silicone.

It has proven particularly advantageous to use a copolymer (A) in which the flexible blocks, preferably polyether blocks, have a relatively high molar mass. Without wishing to be bound by theory, it is assumed that the polyether blocks aid compatibility with the non-crosslinked silicones of the composition according to the invention.

DESCRIPTION OF EMBODIMENTS

The invention is now described in greater detail and in a nonlimiting way in the description which follows.

In the present description, it is specified that, when reference is made to intervals, the expressions of the type "ranging from . . . to", "extending from . . . to" or "comprising from . . . to" include the limits of the interval. Conversely, the expressions of the type "between . . . and . . . " exclude the limits of the interval.

Unless otherwise mentioned, the percentages expressed are percentages by weight. Unless otherwise mentioned, the parameters to which reference is made are measured at atmospheric pressure and ambient temperature (20-25° C., generally 23° C.).

The composition of the present invention is a thermoplastic elastomer, obtained by mixing a TPE (A) and a non-crosslinked silicone (B), and optionally a compatibilizing polymer (C), improving the compatibility between the TPE and the silicone.

The composition according to the invention is an intimate mixture or alloy of polymers, that is to say a macroscopically homogeneous mixture of at least two polymers (A) and (B), indeed even polymers (A), (B) and (C).

Additional components, such as various additives (D), can also be added to the composition according to the invention.

Copolymer (A):

Block copolymer according to the invention is understood to mean thermoplastic elastomer polymers (TPEs), which alternately comprise "hard" or "rigid" blocks or segments (with a rather thermoplastic behavior) and "flexible" or "supple" blocks or segments (with a rather elastomeric behavior). For example, polyamide blocks are known to be "rigid" segments with a melting point (M.p.) or glass transition temperature (Tg) which are higher than the working temperature of the polymer, whereas polyether blocks are "flexible" segments with an M.p. or Tg which are lower than the working temperature of said polymer.

More specifically, a block is said to be "flexible" if it exhibits a low glass transition temperature (Tg). Low glass transition temperature is understood to mean a glass transition temperature Tg of less than 15° C., preferably of less than 0° C., advantageously of less than −15° C., more advantageously still of less than −30° C. optionally of less than −50° C.

Flexible or soft blocks which can be envisaged in the copolymer according to the invention is understood to mean in particular those chosen from polyether blocks, polyester blocks, polysiloxane blocks, such as polydimethylsiloxane or PDMS blocks, polyolefin blocks, polycarbonate blocks and their mixtures. The flexible blocks which can be envisaged are described, for example, in French patent application No. 0 950 637, page 32, line 3, to page 38, line 23. By way of example, the polyether blocks are chosen from poly(ethylene glycol) (PEG), poly(1,2-propylene glycol) (PPG), poly(1,3-propylene glycol) (PO3G), poly(tetramethylene glycol) (PTMG) and their copolymers or mixtures.

The rigid blocks can be based on polyamide, on polyurethane, on polyester or on a mixture of these polymers. These blocks are described in particular in French patent application No. 0 856 752. The rigid blocks are preferably polyamide-based. The polyamide (abbreviated to PA) blocks can comprise homopolyamides or copolyamides. The polyamide blocks which can be envisaged in the composition of the invention are in particular those defined in application FR 0 950 637 from page 27, line 18, to page 31, line 14.

Advantageously, said at least one block copolymer comprises at least one block chosen from: polyether blocks, polyester blocks, polyamide blocks, polyurethane blocks and their mixtures. Mention may be made, as examples of copolymers having rigid blocks and flexible blocks, respectively of (a) copolymers having polyester blocks and polyether blocks (also known as COPEs or copolyetheresters), (b) copolymers having polyurethane blocks and polyether blocks (also known as TPUs, the abbreviation for thermoplastic polyurethanes) and (c) copolymers having polyimide blocks and polyether blocks (also known as PEBAs according to the IUPAC, or also polyether-block-amide).

Preferably, said at least one block copolymer (A) comprises a copolymer having polyamide blocks and polyether blocks (PEBAs).

PEBAs result from the polycondensation of polyamide blocks having reactive ends with polyether blocks having reactive ends, such as, inter alia, the polycondensation:

1) of polyamide blocks having diamine chain ends with polyoxyalkylene blocks having dicarboxyl chain ends;
2) of polyamide blocks having dicarboxyl chain ends with polyoxyalkylene blocks having diamine chain ends, obtained, for example, by cyanoethylation and hydrogenation of α,ω-dihydroxylated aliphatic polyoxyalkylene blocks, known as polyetherdiols;
3) of polyamide blocks having dicarboxyl chain ends with polyetherdiols, the products obtained being, in this specific case, polyetheresteramides.

The polyamide blocks having dicarboxyl chain ends originate, for example, from the condensation of polyamide precursors in the presence of a chain-limiting dicarboxylic acid. The polyamide blocks having diamine chain ends originate, for example, from the condensation of polyamide precursors in the presence of a chain-limiting diamine.

Three types of polyamide blocks can advantageously be used.

According to a first type, the polyamide blocks originate from the condensation of a dicarboxylic acid, in particular those having from 4 to 20 carbon atoms, preferably those having from 6 to 18 carbon atoms, and of an aliphatic or aromatic diamine, in particular those having from 2 to 20 carbon atoms, preferably those having from 6 to 14 carbon atoms.

Mention may be made, as examples of dicarboxylic acids, of 1,4-cyclohexanedicarboxylic acid, butanedioic acid, adipic acid, azelaic acid, suberic acid, sebacic acid, dodecanedicarboxylic acid, octadecanedicarboxylic acid and terephthalic and isophthalic acids, but also dimerized fatty acids.

Mention may be made, as examples of diamines, of tetramethylenediamine, hexamethylenediamine, 1,10-decamethylenediamine, dodecamethylenediamine, trimethylhexamethylenediamine, the isomers of bis(4-aminocyclohexyl) methane (BACM), bis(3-methyl-4-aminocyclohexyl) methane (BMACM) and 2,2-bis(3-methyl-4-aminocyclohexyl)propane (BMACP), para-aminodicyclohexylmethane (PACM) isophoronediamine (IPDA), 2,6-bis(aminomethyl)norbornane (BAMN) and piperazine (Pip). Advantageously, polyamide blocks PA 4.12, PA 4.14, PA 4.18, PA 6.10, PA 6.12, PA 6.14, PA 6.18, PA 9.12, PA 10.10, PA 10.12, PA 10.14 and PA 10.18 are used. In the PA X,Y notation, X represents the number of carbon atoms resulting from the diamine residues and Y represents the number of carbon atoms resulting from the diacid residues, in a conventional way.

According to a second type, the polyamide blocks result from the condensation of one or more α,ω-aminocarboxylic acids and/or of one or more lactams having from 6 to 12 carbon atoms in the presence of a dicarboxylic acid having from 4 to 12 carbon atoms or of a diamine. Mention may be made, as examples of lactams, of caprolactam, oenantholactam and lauryllactam. Mention may be made, as examples of α,ω-aminocarboxylic acids, of aminocaproic acid, 7-aminoheptanoic acid, 11-aminoundecanoic acid and 12-aminododecanoic acid.

Advantageously, the polyamide blocks of the second type are PA 11 (polyundecanamide), PA 12 (polydodecanamide) or PA 6 (polycaprolactam) blocks. In the PA X notation, X represents the number of carbon atoms resulting from the amino acid residues.

According to a third type, the polyamide blocks result from the condensation of at least one α,ω-aminocarboxylic acid (or one lactam), at least one diamine and at least one dicarboxylic acid.

In this case, the polyamide PA blocks are prepared by polycondensation:

- of the linear aliphatic or aromatic diamine(s) having X carbon atoms;
- of the dicarboxylic acid(s) having Y carbon atoms; and
- of the comonomer(s) {Z}, chosen from lactams and α,ω-aminocarboxylic acids having Z carbon atoms and equimolar mixtures of at least one diamine having X1 carbon atoms and of at least one dicarboxylic acid having Y1 carbon atoms, (X1, Y1) being different from (X, Y);
- said comonomer(s) {Z} being introduced in a proportion by weight advantageously ranging up to 50%, preferably up to 20%, more advantageously still up to 10%, with respect to the combined polyamide precursor monomers;
- in the presence of a chain stopper chosen from dicarboxylic acids.

Advantageously, the dicarboxylic acid having Y carbon atoms is used as chain stopper, which acid is introduced in excess with respect to the stoichiometry of the diamine(s).

According to an alternative form of this third type, the polyamide blocks result from the condensation of at least two α,ω-aminocarboxylic acids or of at least two lactams having from 6 to 12 carbon atoms or of a lactam and of an aminocarboxylic acid not having the same number of carbon atoms, in the optional presence of a chain stopper. Mention may be made, as examples of aliphatic α,ω-aminocarboxylic acids, of aminocaproic acid, 7-aminoheptanoic acid, 11-aminoundecanoic acid, and 12-aminododecanoic acid. Mention may be made, as examples of lactams, of caprolactam, oenantholactam and lauryllactam. Mention may be made, as examples of aliphatic diamines, of hexamethylenediamine, dodecamethylenediamine and trimethylhexamethylenediamine. Mention may be made, as examples of cycloaliphatic diacids, of 1,4-cyclohexanedicarboxylic acid. Mention may be made, as examples of aliphatic diacids, of butanedioic acid, adipic acid, azelaic acid, suberic acid, sebacic acid, dodecanedicarboxylic acid or dimerized fatty acids. These dimerized fatty acids preferably have a dimer content of at least 98%; preferably, they are hydrogenated; they are, for example, the products marketed under the Pripol brand by Croda or under the Empol brand by BASF or under the Radiacid brand by Oleon, and polyoxyalkylene-α,ω-diacids. Mention may be made, as examples of aromatic diacids, of terephthalic acid (T) and isophthalic acid (I). Mention may be made, as examples of cycloaliphatic diamines, of the isomers of bis(4-aminocyclohexyl)methane (BACM), bis(3-methyl-4-aminocyclohexyl)methane (BMACM) and 2,2-bis(3-methyl-4-aminocyclohexyl)propane (BMACP), and para-aminodicyclohexylmethane (PACM). The other diamines commonly used can be isophoronediamine (IPDA), 2,6-bis(aminonaethyl)norbornane (BAMN) and piperazine.

Mention may be made, as examples of polyamide blocks of the third type, of the following:

- PA 6.6/6, where 6.6 denotes hexamethylenediamine units condensed with adipic acid and 6 denotes units resulting from the condensation of caprolactam;
- PA 6.6/6.10/11/12, where 6.6 denotes hexamethylenediamine condensed with adipic acid, 6.10 denotes hexamethylenediamine condensed with sebacic acid, 11 denotes units resulting from the condensation of aminoundecanoic acid and 12 denotes units resulting from the condensation of lauryllactam.

The notations PA X/Y, PA X/Y/Z, and the like, relate to copolyamides in which X, Y, Z, and the like, represent homopolyamide units as described above.

Advantageously, the polyamide blocks of the copolymer used in the invention comprise blocks of polyamide PA 6, PA 11, PA 12, PA 5.4, PA 5.9, PA 5.10, PA 5.12, PA 5.13, PA 5.14, PA 5.16, PA 5.18, PA 5.36, PA 6.4, PA 6.9, PA 6.10, PA 6.12, PA 6.13, PA 6.14, PA 6.16, PA 6.18, PA 6.36, PA 10.4, PA 10.9, PA 10.10, PA 10.12, PA 10.13, PA 10.14, PA 10.16, PA 10.18, PA 10.36, PA 10. T, PA 12.4, PA 12.9, PA 12.10, PA 12.12, PA 12.13, PA 12.14, PA 12.16, PA 12.18, PA 12.36, PA 12. T, or mixtures or copolymers of these; and preferably comprise blocks of polyamide PA 6, PA 11, PA 12, PA 6.10, PA 10.10, PA 10.12, or mixtures or copolymers of these.

The polyether blocks consist of alkylene oxide units. The polyether blocks can in particular be PEG (polyethylene glycol) blocks, that is to say consisting of ethylene oxide units, and/or PPG (propylene glycol) blocks, that is to say consisting of propylene oxide units, and/or PO3G (polytrimethylene glycol) blocks, that is to say consisting of polytrimethylene ether glycol units, and/or PTMG blocks, that is to say consisting of tetramethylene glycol units, also called polytetrahydrofuran. The PEBA copolymers can comprise several types of polyethers in their chain, it being possible for the copolyethers to be block or random.

Use may also be made of blocks obtained by oxyethylation of bisphenols, such as, for example, bisphenol A. The latter products are described in particular in the document EP 613 919.

The polyether blocks can also consist of ethoxylated primary amines. Mention may be made, as examples of ethoxylated primary amines, of the products of formula:

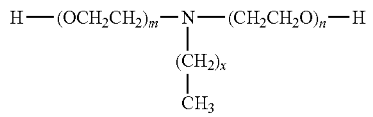

in which m and n are integers between 1 and 20 and x is an integer between 8 and 18. These products are, for example, commercially available under the Noramox® brand from CECA and under the Genamin® brand from Clariant.

The flexible polyether blocks can comprise polyoxyalkylene blocks having $NH_2$ chain ends, it being possible for such blocks to be obtained by cyanoacetylation of aliphatic α,ω-dihydroxylated polyoxyalkylene blocks called polyetherdiols. More particularly, the Jeffamine or Elastamine commercial products can be used (for example Jeffamine® D400, D2000, ED 2003, XTJ 542, commercial products from Huntsman, also described in the documents JP 2004346274, JP 2004352794 and EP 1 482 011).

The polyetherdiol blocks arc either used as is and copolycondensed with polyamide blocks having carboxyl end groups, or aminated in order to be converted into polyetherdiamines and condensed with polyamide blocks having carboxyl end groups. The general method for the two-stage preparation of the PEBA copolymers having ester bonds between the PA blocks and the PE blocks is known and is described, for example, in the document FR 2 846 332. The general method for the preparation of the PEBA copolymers of the invention having amide bonds between the PA blocks and the PE blocks is known and is described, for example, in the document EP 1 482 011. The polyether blocks can also be mixed with polyamide precursors and a diacid chain stopper in order to prepare polymers having polyamide blocks and polyether blocks possessing randomly distributed units (one-stage process).

Of course, the designation PEBA in the present description of the invention relates just as well to the PEBAX® products sold by Arkema, to the Vestamid® products sold by Evonik®, to the Grilamid® products, to the Griflex products sold by EMS, as to the PEBA-type Pelestat® products sold by Sanyo or to any other PEBA from other suppliers.

While the block copolymers described above generally comprise at least one polyamide block and at least one polyether block, the present invention also covers all the copolymer alloys comprising two, three, four (indeed even more) different blocks chosen from those described in this description.

For example, the copolymer according to the invention can be a segmented block copolymer comprising three different types of blocks (or "triblock"), which results from the condensation of several of the blocks described above. Said triblock is preferably chosen from copolyetheresteramides and copolyetheramideurethanes.

PEBA copolymers which are particularly preferred in the context of the invention are: PA12-PEG, PA6-PEG, PA6/12-PEG, PA11-PEG, PA12-PTMG, PA6-PTMG, PA6/12-PTMG, PA11-PTMG, PA12-PEG/PPG, PA6-PEG/PPG, PA6/12-PEG/PPG, PA11-PEG/PPG, PA11/PO3G, PA6.10/PO3G and/or PA10.10/PO3G.

Preferably, the PA blocks comprise at least 30%, preferably at least 50%, preferably at least 75%, preferably 100%, by weight of PA 11 and/or PA 12, as regards the total weight of the PA blocks.

The polyether blocks preferably represent from 50% to 80% of the total weight of the block copolymer (A) used in the composition according to the invention.

Advantageously, the number-average molar mass of the polyamide blocks in the PEBA copolymer has a value from 200 to 2000 g/mol; the number-average molar mass of the polyether blocks has a value from 800 to 2500 g/mol; and the ratio by weight of the polyamide blocks with respect to the polyether blocks of the copolymer is from 0.1 to 1.2.

The number-average molar mass is fixed by the content of chain stopper. It can be calculated according to the relationship:

Mn=(nmonomer/nstopper)*Mrepeat unit+Mstopper nmonomer=number of moles of monomer nstopper=number of moles of diacid in excess Mrepeat unit=molar mass of the repeat unit Mstopper=molar mass of the diacid in excess According to specific embodiments, the copolymers are defined by the following ranges of number-average molar masses $M_n$:

| | $M_n$ of block polyamides | $M_n$ of polyether blocks |
|---|---|---|
| No. 1 | 200 to 300 g/mol | 800 to 1000 g/mol |
| No. 2 | 300 to 400 g/mol | 800 to 1000 g/mol |
| No. 3 | 400 to 500 g/mol | 800 to 1000 g/mol |
| No. 4 | 500 to 600 g/mol | 800 to 1000 g/mol |
| No. 5 | 600 to 700 g/mol | 800 to 1000 g/mol |
| No. 6 | 700 to 800 g/mol | 800 to 1000 g/mol |
| No. 7 | 800 to 900 g/mol | 800 to 1000 g/mol |
| No. 8 | 900 to 1000 g/mol | 800 to 1000 g/mol |
| No. 9 | 200 to 300 g/mol | 1000 to 1200 g/mol |
| No. 10 | 300 to 400 g/mol | 1000 to 1200 g/mol |
| No. 11 | 400 to 500 g/mol | 1000 to 1200 g/mol |
| No. 12 | 500 to 600 g/mol | 1000 to 1200 g/mol |
| No. 13 | 600 to 700 g/mol | 1000 to 1200 g/mol |
| No. 14 | 700 to 800 g/mol | 1000 to 1200 g/mol |
| No. 15 | 800 to 900 g/mol | 1000 to 1200 g/mol |
| No. 16 | 900 to 1000 g/mol | 1000 to 1200 g/mol |
| No. 17 | 1000 to 1100 g/mol | 1000 to 1200 g/mol |
| No. 18 | 200 to 300 g/mol | 1200 to 1400 g/mol |
| No. 19 | 300 to 400 g/mol | 1200 to 1400 g/mol |
| No. 20 | 400 to 500 g/mol | 1200 to 1400 g/mol |
| No. 21 | 500 to 600 g/mol | 1200 to 1400 g/mol |
| No. 22 | 600 to 700 g/mol | 1200 to 1400 g/mol |
| No. 23 | 700 to 800 g/mol | 1200 to 1400 g/mol |
| No. 24 | 800 to 900 g/mol | 1200 to 1400 g/mol |
| No. 25 | 900 to 1000 g/mol | 1200 to 1400 g/mol |
| No. 26 | 1000 to 1100 g/mol | 1200 to 1400 g/mol |
| No. 27 | 1100 to 1200 g/mol | 1200 to 1400 g/mol |
| No. 28 | 1200 to 1300 g/mol | 1200 to 1400 g/mol |
| No. 29 | 200 to 300 g/mol | 1400 to 1600 g/mol |
| No. 30 | 300 to 400 g/mol | 1400 to 1600 g/mol |
| No. 31 | 400 to 500 g/mol | 1400 to 1600 g/mol |
| No. 32 | 500 to 600 g/mol | 1400 to 1600 g/mol |
| No. 33 | 600 to 700 g/mol | 1400 to 1600 g/mol |
| No. 34 | 700 to 800 g/mol | 1400 to 1600 g/mol |
| No. 35 | 800 to 900 g/mol | 1400 to 1600 g/mol |
| No. 36 | 900 to 1000 g/mol | 1400 to 1600 g/mol |
| No. 37 | 1000 to 1100 g/mol | 1400 to 1600 g/mol |
| No. 38 | 1100 to 1200 g/mol | 1400 to 1600 g/mol |
| No. 39 | 1200 to 1300 g/mol | 1400 to 1600 g/mol |
| No. 40 | 1300 to 1400 g/mol | 1400 to 1600 g/mol |
| No. 41 | 1400 to 1500 g/mol | 1400 to 1600 g/mol |
| No. 42 | 200 to 300 g/mol | 1600 to 1800 g/mol |
| No. 43 | 300 to 400 g/mol | 1600 to 1800 g/mol |
| No. 44 | 400 to 500 g/mol | 1600 to 1800 g/mol |
| No. 45 | 500 to 600 g/mol | 1600 to 1800 g/mol |

-continued

| | $M_n$ of block polyamides | $M_n$ of polyether blocks |
|---|---|---|
| No. 46 | 600 to 700 g/mol | 1600 to 1800 g/mol |
| No. 47 | 700 to 800 g/mol | 1600 to 1800 g/mol |
| No. 48 | 800 to 900 g/mol | 1600 to 1800 g/mol |
| No. 49 | 900 to 1000 g/mol | 1600 to 1800 g/mol |
| No. 50 | 1000 to 1100 g/mol | 1600 to 1800 g/mol |
| No. 51 | 1100 to 1200 g/mol | 1600 to 1800 g/mol |
| No. 52 | 1200 to 1300 g/mol | 1600 to 1800 g/mol |
| No. 53 | 1300 to 1400 g/mol | 1600 to 1800 g/mol |
| No. 54 | 1400 to 1500 g/mol | 1600 to 1800 g/mol |
| No. 55 | 200 to 300 g/mol | 1800 to 2000 g/mol |
| No. 56 | 300 to 400 g/mol | 1800 to 2000 g/mol |
| No. 57 | 400 to 500 g/mol | 1800 to 2000 g/mol |
| No. 58 | 500 to 600 g/mol | 1800 to 2000 g/mol |
| No. 59 | 600 to 700 g/mol | 1800 to 2000 g/mol |
| No. 60 | 700 to 800 g/mol | 1800 to 2000 g/mol |
| No. 61 | 800 to 900 g/mol | 1800 to 2000 g/mol |
| No. 62 | 900 to 1000 g/mol | 1800 to 2000 g/mol |
| No. 63 | 1000 to 1100 g/mol | 1800 to 2000 g/mol |
| No. 64 | 1100 to 1200 g/mol | 1800 to 2000 g/mol |
| No. 65 | 1200 to 1300 g/mol | 1800 to 2000 g/mol |
| No. 66 | 1300 to 1400 g/mol | 1800 to 2000 g/mol |
| No. 67 | 1400 to 1500 g/mol | 1800 to 2000 g/mol |
| No. 68 | 200 to 300 g/mol | 2000 to 2200 g/mol |
| No. 69 | 300 to 400 g/mol | 2000 to 2200 g/mol |
| No. 70 | 400 to 500 g/mol | 2000 to 2200 g/mol |
| No. 71 | 500 to 600 g/mol | 2000 to 2200 g/mol |
| No. 72 | 600 to 700 g/mol | 2000 to 2200 g/mol |
| No. 73 | 700 to 800 g/mol | 2000 to 2200 g/mol |
| No. 74 | 800 to 900 g/mol | 2000 to 2200 g/mol |
| No. 75 | 900 to 1000 g/mol | 2000 to 2200 g/mol |
| No. 76 | 1000 to 1100 g/mol | 2000 to 2200 g/mol |
| No. 77 | 1100 to 1200 g/mol | 2000 to 2200 g/mol |
| No. 78 | 1200 to 1300 g/mol | 2000 to 2200 g/mol |
| No. 79 | 1300 to 1400 g/mol | 2000 to 2200 g/mol |
| No. 80 | 1400 to 1500 g/mol | 2000 to 2200 g/mol |
| No. 81 | 200 to 300 g/mol | 2200 to 2500 g/mol |
| No. 82 | 300 to 400 g/mol | 2200 to 2500 g/mol |
| No. 83 | 400 to 500 g/mol | 2200 to 2500 g/mol |
| No. 84 | 500 to 600 g/mol | 2200 to 2500 g/mol |
| No. 85 | 600 to 700 g/mol | 2200 to 2500 g/mol |
| No. 86 | 700 to 800 g/mol | 2200 to 2500 g/mol |
| No. 87 | 800 to 900 g/mol | 2200 to 2500 g/mol |
| No. 88 | 900 to 1000 g/mol | 2200 to 2500 g/mol |
| No. 89 | 1000 to 1100 g/mol | 2200 to 2500 g/mol |
| No. 90 | 1100 to 1200 g/mol | 2200 to 2500 g/mol |
| No. 91 | 1200 to 1300 g/mol | 2200 to 2500 g/mol |
| No. 92 | 1300 to 1400 g/mol | 2200 to 2500 g/mol |
| No. 93 | 1400 to 1500 g/mol | 2200 to 2500 g/mol |

Preferably, the ratio by weight of the polyamide blocks with respect to the polyether blocks of the copolymer is from 0.1 to 1.2; preferably 0.1 to 1; preferably from 0.2 to 0.5. This ratio by weight can be calculated by dividing the number-average molar mass of the polyamide blocks by the number-average molar mass of the polyether blocks.

According to specific embodiments, this ratio has a value from 0.1 to 0.2; or from 0.2 to 0.3; or from 0.3 to 0.4; or from 0.4 to 0.5; or from 0.5 to 0.6; or from 0.6 to 0.7; or from 0.7 to 0.8; or from 0.8 to 0.9.

Preferably, the copolymer used in the invention exhibits an instantaneous hardness of less than or equal to 45 Shore D, more preferably of less than or equal to 35 Shore D, more preferably of less than or equal to 25 Shore D. The hardness measurements can be carried out according to the standard ISO 868.

Advantageously, the copolymer has an inherent viscosity of 2 or less; preferably of 1.5 or less; preferably of 1.4 or less; preferably of 1.3 or less; preferably of 1.2 or less. In the present description, the inherent viscosity is determined according to the standard ISO 307:2007 in m-cresol at a temperature of 20° C., at a polymer concentration of 0.5% by weight in solution in meta-cresol with respect to the total weight of the solution, using an Ubbelohde viscometer.

The Silicone (B)

The silicone or "polysiloxane" used in the composition of the present invention is non-crosslinked and non-crosslinkable. It can advantageously be polyorganosiloxane by comprising one or more organic chains, indeed even comprise groups, preferably polar functional groups, which promote its compatibility or its mixing with the other components, in particular the TPE, of the present composition.

Within the meaning the present invention:

"non-crosslinked silicone" is understood to mean a silicone which is neither crosslinked nor crosslinkable, even in situ, in the composition according to the invention or during its use in order to obtain the final product. In particular, non-crosslinked/non-crosslinkable silicone is understood to mean a silicone not containing alkenyl groups having from 2 to 20 carbon atoms in the molecule, in particular a silicone not containing a vinyl, allyl, butenyl, pentenyl, hexenyl or decenyl group capable of causing the silicone to crosslink.

This requirement for the silicone of the present composition not only ensures the ability for transformation (processability), the ease of use, but also the recyclability of the composition according to the invention.

"polysiloxane" is understood to mean a polymer comprising a polymeric backbone composed of siloxy —(Si($R_2$)—O—)— repeat units which can be cyclic, linear or branched units, for example lower dialkylsiloxy units, such as in particular dimethylsiloxy units, and optionally organic side groups.

The organic groups (that is to say, non-alkenyl groups) bonded by the silicon are preferably independently drawn from hydrocarbons or from halogenated hydrocarbon groups which contain no aliphatic unsaturation. These can be specifically illustrated by alkyl groups having from 1 to 20 carbon atoms, such as methyl, ethyl, propyl, butyl, pentyl and hexyl; cycloalkyl groups such as cyclohexyl and cycloheptyl; aryl groups of 6 to 12 carbon atoms, such as phenyl, tolyl and xylyl; aralkyl groups of 7 to 20 carbon atoms, such as benzyl and phenethyl; and halogenated alkyl groups having from 1 to 20 carbon atoms, such as 3,3,3-trifluoropropyl and chloromethyl.

Mention may in particular very simply be made of linear polydimethylsiloxane (PDMS).

"polyorganosiloxane" is understood to mean a polymer which combines siloxy —(Si($R_2$)—O—)— repeat units of silicones with hydrocarbons or repeat units having a hydrocarbon main chain. It can then concern copolymers. One advantageous example is polysiloxane-co-urethane (for example in the Carbosil® range from DSM). It can also concern a branched copolymer. An example is the CoatOSil® range from Momentive, which carries a pendent polyether group on a silicone backbone. Conversely, a hydrocarbon backbone branched with silicone chain can also be envisaged and included in the definition of the polyorganosiloxane which can be used in the composition according to the invention.

"poly(organo)siloxane having a polar functional group" is understood to mean a poly(organo)siloxane having at least one polar radical, the polar radical being present at one of the ends of the poly(organo)siloxane backbone or on the poly(organo)siloxane backbone.

"polar radical" is understood to mean a radical which confers polar properties on the organopolysiloxane. Examples of polar radicals according to the present invention are: hydroxy, hydroxyl, urea, amine, amide, carboxylate, ester, ether, acrylate, thiol, sulfonate, sulfate and phosphate. Mention may be made, by way of example, of the Baysilone® range from Momentive, which in particular comprises an amine-functionalized polyorganosiloxane.

The Compatibilizer (C):

The compatibilizer advantageously consists of a polymer exhibiting a flexural modulus of less than 100 MPa, measured according to the standard ISO 178, and a Tg of less than 0° C. (measured according to the standard 11357-2 at the inflection point of the DSC thermogram), in particular a polyolefin.

The polyolefin of the compatibilizer can be functionalized or nonfunctionalized or be a mixture of at least one functionalized and/or of at least one nonfunctionalized. To simplify, the polyolefin has been denoted by (C), and functionalized polyolefins (C1) and nonfunctionalized polyolefins (C2) have been described below.

A nonfunctionalized polyolefin (C2) is conventionally a homopolymer or copolymer of α-olefins or of diolefins, such as, for example, ethylene, propylene, 1-butene, 1-octene or butadiene. Mention may be made, by way of example, of:

polyethylene homopolymers and copolymers, in particular LDPE, HDPE, LLDPE (linear low density polyethylene), VLDPE (very low density polyethylene) and metallocene polyethylene, propylene homopolymers or copolymers, ethylene/α-olefin copolymers, such as ethylene/propylene, EPRs (abbreviation of ethylene/propylene rubbers) and ethylene/propylene/dienes (EPDMs), styrene/ethylene-butene/styrene (SEBS), styrene/butadiene/styrene (SBS), styrene/isoprene/styrene (SIS) or styrene/ethylene-propylene/styrene (SEPS) block copolymers, copolymers of ethylene with at least one product chosen from salts or esters of unsaturated carboxylic acids, such as alkyl (meth)acrylate (for example methyl acrylate), or vinyl esters of saturated carboxylic acids, such as vinyl acetate (EVA), it being possible for the proportion of comonomer to reach 40% by weight.

The functionalized polyolefin (C1) can be a polymer of α-olefins having reactive units (the functionalities); such reactive units are acid, anhydride or epoxy functional groups. Mention may be made, by way of example, of the preceding polyolefins (C2) grafted or copolymerized or terpolymerized by unsaturated epoxides, such as glycidyl (meth)acrylate, or by carboxylic acids or the corresponding salts or esters, such as (meth)acrylic acid (it being possible for the latter to be completely or partially neutralized by metals such as Zn, and the like), or else by carboxylic acid anhydrides, such as maleic anhydride. A functionalized polyolefin is, for example, a PE/EPR mixture, the ratio by weight of which can vary within broad limits, for example between 40/60 and 90/10, said mixture being cografted with an anhydride, in particular maleic anhydride, according to a degree of grafting, for example, from 0.01% to 5% by weight.

The functionalized polyolefin (C1) can be chosen from the following (co)polymers, grafted with maleic anhydride or glycidyl methacrylate, in which the degree of grafting is, for example, from 0.01% to 5% by weight:

PE, PP, copolymers of ethylene with propylene, butene, hexene or octene containing, for example, from 35% to 80% by weight of ethylene;

ethylene/α-olefin copolymers, such as ethylene/propylene, EPRs (abbreviation of ethylene/propylene rubbers) and ethylene/propylene/dienes (EPDMs), styrene/ethylene-butene/styrene (SEBS), styrene/butadiene/styrene (SBS), styrene/isoprene/styrene (SIS) or styrene/ethylene-propylene/styrene (SEPS) block copolymers, copolymers of ethylene and vinyl acetate (EVA), containing up to 40% by weight of vinyl acetate;

copolymers of ethylene and alkyl (meth)acrylate, containing up to 40% by weight of alkyl (meth)acrylate;

copolymers of ethylene and vinyl acetate (EVA) and alkyl (meth)acrylate, containing up to 40% by weight of comonomers.

The functionalized polyolefin (C1) can also be chosen from ethylene/propylene copolymers, predominant in propylene, grafted by maleic anhydride and then condensed with monoaminated polyamide (or a polyamide oligomer) (products described in EP-A-0 342 066).

The functionalized polyolefin (C1) can also be a copolymer or terpolymer of at least the following units: (1) ethylene, (2) alkyl (meth)acrylate or saturated carboxylic acid vinyl ester and (3) anhydride, such as maleic or (meth)acrylic acid anhydride, or epoxy, such as glycidyl (meth)acrylate.

Mention may be made, as examples of functionalized polyolefins of the latter type, of the following copolymers, where ethylene preferably represents at least 60% by weight and where the termonomer (the functional group) represents, for example, from 0.1% to 10% by weight of the copolymer:

ethylene/alkyl (meth)acrylate/(meth)acrylic acid or maleic anhydride or glycidyl methacrylate copolymers;

ethylene/vinyl acetate/maleic anhydride or glycidyl methacrylate copolymers;

ethylene/vinyl acetate or alkyl (meth)acrylate/(meth) acrylic acid or maleic anhydride or glycidyl methacrylate copolymers.

In the preceding copolymers, the (meth)acrylic acid can be salified with Zn or Li.

The term "alkyl (meth)acrylate" in (C1) or (C2) denotes $C_1$ to $C_8$ alkyl methacrylates and acrylates and can be chosen from methyl acrylate, ethyl acrylate, n-butyl acrylate, isobutyl acrylate, 2-ethylhexyl acrylate, cyclohexyl acrylate, methyl methacrylate and ethyl methacrylate.

The abovementioned copolymers, (C1) and (C2), can be copolymerized in random or block fashion and can exhibit a linear or branched structure.

The molecular weight, the MFI index and the density of these polyolefins can also vary within a broad range, which will be perceived by a person skilled in the art. MFI is the abbreviation for Melt Flow Index. It is measured according to the standard ISO 1133.

The nonfunctionalized polyolefins (C2) are advantageously chosen from polypropylene homopolymers or copolymers, and any ethylene homopolymer, or copolymer of ethylene and of a comonomer of higher α-olefin type, such as butene, hexene, octene or 4-methyl-1-pentene. Mention may be made, for example, of PPs, high density PEs, medium density PEs, linear low density PEs, low density PEs or ultra low density PEs. These polyethylenes are known by a person skilled in the art as being produced according to a "radical" process, according to a "Ziegler" type catalysis or, more recently, according to a "metallocene" catalysis.

The functionalized polyolefins (C1) are advantageously chosen from any polymer comprising α-olefin units and units carrying reactive polar functional groups, such as epoxy, carboxylic acid or carboxylic acid anhydride functional groups. Mention may be made, by way of example of such polymers, of terpolymers of ethylene, of alkyl acrylate and of maleic anhydride or of glycidyl methacrylate, such as the Lotader® products of the applicant company, or polyolefins grafted by maleic anhydride, such as the Orevac® products of the applicant company, and also terpolymers of ethylene, of alkyl acrylate and of (meth)acrylic acid. Mention may also be made of homopolymers or copolymers of polypropylene grafted by a carboxylic acid anhydride and then condensed with polyamides or oligomers, which are monoaminated, of polyamide.

The MFI of the copolymer (A) and the MFI of the compatibilizer (C) can be chosen within a wide range. However, to facilitate the dispersion of (C), it is recommended that the MFI of the copolymer (A) be greater than that of (C).

Additives

Advantageously, the composition of the invention comprises at least one additive selected from organic or inorganic fillers, reinforcing agents, plasticizers, stabilizers, antioxidants, UV stabilizers, flame retardants, carbon black, carbon nanotubes, pigments, dyes, mold-release agents, lubricants, foaming agents, impact-resistant agents, nucleating agents, surface-modifying agents and their mixtures.

Manufacturing Process

The process for the manufacture of the composition according to the invention comprises carrying out the mixing of block copolymer (A) and of non-crosslinked silicone (B), and of the optional other components (C) and/or (D).

The mixing is preferably carried out in a device for mixing in the molten state, such as a twin-screw or single-screw extruder, or else in a device using Buss co-kneaders.

Preferably, said mixing is carried out in a twin-screw extruder.

It is preferably carried out at a temperature of the order of 150° C. to 250° C., preferably of 160° C. to 220° C.

The thermoplastic elastomer composition according to the invention can then be processed by conventional techniques, such as extrusion, vacuum forming, injection molding, blow molding, overmolding or compression molding. In addition, the compositions according to the invention can be retransformed (recycled) with little or no deterioration, in the mechanical properties.

Applications

The novel thermoplastic elastomers with a composition in accordance with the present invention can be used to manufacture insulators of wires and cables; sound and vibration dampening components; electrical connectors; automotive components and appliances, such as belts, hoses, air lines, bellows, gaskets and fuel line components; furniture components; soft-feel handles for portable devices (for example, tool handles); seals for architecture; bottle closures; medical devices; sports equipment; and other parts of components generally of rubber appearance which can be replaced by components with a composition according to the invention.

A subject-matter of the present invention is in particular an article or an article part chosen from a footwear sole, in particular a sports footwear sole, such as an insole, midsole or outer sole, a ski boot liner, a sock, a racket, an inflatable ball, a solid ball, a floater, gloves, personal protection equipment, a helmet, a rail foot, a motor vehicle part, a pushchair part, a tire, a wheel, a smooth-riding wheel, such as a tire, a handle, a seat element, a child car seat part, a construction part, an electrical and/or electronic equipment part, an electronic protection part, an audio equipment, acoustic insulation and/or heat insulation part, a part targeted at dampening impacts and/or vibrations, such as those generated by a means of transport, a padding element, a toy, a medical object, such as a splint, an orthosis, a cervical collar, a dressing, in particular an antimicrobial foam dressing, an art or handicraft object, a life jacket, a backpack, a membrane, a carpet, a sports mat, a sports floor covering, a carpet underlay, and any article comprising a mixture of these articles.

The thermoplastic elastomers of the present invention are particularly useful for manufacturing the following articles:

- footwear and especially sports footwear, in particular the soles, outer soles, insoles or midsoles; this is because the compositions of the invention have properties of good adhesion to PEBA and to polyamide, in particular by overmolding, good abrasion resistance and they can be easily transformed into footwear components;
- in the optical industry: components of spectacle frames, nose pads or nosepieces, protective elements on frames; this is because the compositions of the invention have a soft-silky feel, adhere well to polyamide and more specifically to transparent polyamide by overmolding, and resistant to sebum;
- in the automotive industry: interior decorative elements; this is because the compositions of the invention have a soft feel, good haptic properties, adhere perfectly by overmolding, are resistant to sebum and resistant to abrasion;
- in manufacturing industry: transmission or conveyor belts, silent gears; this is because the compositions of the invention are resistant to heat, resistant to abrasion, and easy to process by overmolding;
- in the medical sector: patches, biofeedback patches, drug delivery systems, sensors;
- in the electronics industry: headsets, earphones, Bluetooth® jewelry and watches, display screens, connected watches, connected glasses, interactive game components and devices, GPS, connected footwear, bioactivity monitors and sensors, interactive belts and bracelets, child or pet tracker, pocket scanner or palmtop, location sensors, trackers or vision assist.

In a preferred embodiment, the compositions of the invention are used for the manufacture of a casing or protective casing in items of electrical or electronic equipment, such as in particular a portable computer, a portable telephone or a tablet.

EXAMPLES

The following examples illustrate the invention without limiting it.

Materials Used in the Examples

Compositions According to the Invention

A:

PEBA 2+30% of polyorganosiloxane polycarbonate polyurethane copolymer (Carbosil® 20 80A silicone from DSM).

B:

PEBA 2+15% of polyorganosiloxane polycarbonate polyurethane copolymer (Carbosil® 20 80A from DSM)+15% of styrene/ethylene-butylene/styrene block copolymer grafted by maleic anhydride (Kraton® FG-1924).

C:

PEBA 3+15% of polyorganosiloxane polycarbonate polyurethane copolymer (Carbosil® 20 80A from DSM)+15% of styrene/ethylene-butylene/styrene block copolymer grafted by maleic anhydride (Kraton® FG-1924).

D:

PEBA 4 (PA12-PTMG (Mn: 2000-1000), copolymer having PA 12 blocks and PTMG blocks with respective number-average molecular weights (Mn) 2000-1000. The ratio by weight: PA blocks/PE blocks=2)+15% of polyorganosiloxane polycarbonate polyurethane copolymer (Carbosil® 20 80A from DSM)+15% of styrene/ethylene-butylene/styrene block copolymer grafted by maleic anhydride (Kraton® PG-1924).

COMPARATIVE EXAMPLES

E:

PEBA 1: PA 12-PTMG (Mn: 600-2000)

PEBA 1 is a copolymer having PA 12 blocks and PTMG blocks with respective number-average molecular weights (Mn) 600-2000.

The ratio by weight: PA blocks/PE blocks=0.3

F:

PEBA 2: PA 12-PTMG (Mn: 850-2000)

PEBA 2 is a copolymer according to the invention having PA 12 blocks and PTMG blocks with respective number-average molecular weights (Mn) 850-2000.

The ratio by weight: PA blocks/PE blocks=0.4

G:

PEBA 3: PA 12-PTMG (Mn: 2000-2000)

PEBA 3 is a copolymer according to the invention having PA 12 blocks and PTMG blocks with respective number-average molecular weights (Mn) 2000-2000.

The ratio by weight: PA blocks/PE blocks=1

H:

TPU-based thermoplastic crosslinked silicone (TPSiV® 4000-75A SR, Multibase)

I:

TPU (Desmopan® 9370AU, Covestro)

Formulations A to I are prepared (by mixing in the case of A, B, C and D) in a twin-screw extruder at a temperature of 210° C.

Tensile testing plaques and bars are produced by injection molding at 200° C. in a mold at 30° C. The results of measurement of the properties of these plaques and bars, with respective compositions A to I, are shown in the following table 1.

TABLE 1

Target values sought by the invention and results of measurement of the properties measured on dumbbells (plaques or bars) with compositions A to I

| | Target | A | B | C | D |
|---|---|---|---|---|---|
| Physicochemical properties | | | | | |
| Density | <1.0 | 0.96 | 0.98 | 1.00 | 1.00 |
| Resistance to exudation | ○ | ○ | ○ | ○ | ○ |
| Chemical resistance (including sebum) | (++) | ++ | ++ | ++ | ++ |

TABLE 1-continued

Target values sought by the invention and results of measurement of the properties measured on dumbbells (plaques or bars) with compositions A to I

| | | | | | |
|---|---|---|---|---|---|
| Resistance to stains/to soiling | (++) | ++ | ++ | ++ | + |
| "Peachskin" feel | 5 | 5 | 5 | 5 | 4 |
| Mechanical properties | | | | | |
| Hardness, instantaneous (Shore A) | <80 | 75 | 75 | 83 | 91 |
| Hardness, 15 s (Shore A) | <75 | 70 | 70 | 82 | 90 |
| Tensile test, stress at 25% strain (MPa) | <2.0 | 1.7 | 1.8 | 5.9 | 8.7 |
| Tensile test, stress at 100% strain (MPa) | <4.0 | 2.9 | 3.1 | 7.4 | 10.9 |
| Tensile test, breaking stress (MPa) | >10 | >10 | >11 | | |
| Tensile test, elongation at break (%) | >500 | >500 | >500 | | |
| Flexural modulus (MPa) | < or = 12 | 10 | 10 | | |
| Tear strength (kN/m) | >40 | 35 | 45 | 47 | |
| Taber abrasion resistance - H18 grinding wheel (weight loss in mg/1000 revolutions) | <50 | 70 | 40 | 80 | 106 |
| Taber abrasion resistance - CS10 grinding wheel (weight loss in mg/1000 revolutions) | <50 | 50 | 19 | | |
| Compressive residual strain (%) at 23° C. | <20 | 20 | 20 | 34 | |
| Compressive residual strain (%) at 70° C. | | 73 | 72 | 22 | 13 |
| Ease of processing | | | | | |
| Melt Flow Index at 235° C., 1 kg (g/10 min) | >10 | | | | |
| Ease of injection | ○ | ○ | ○ | ○ | ○ |
| Ease of removal from the mold | ○ | ○ | ○ | ○ | ○ |
| Recyclability | ○ | ○ | ○ | ○ | ○ |

| | Target | E | F | G | H: | I |
|---|---|---|---|---|---|---|
| Physicochemical properties | | | | | | |
| Density | <1.0 | 1.00 | 1.00 | 1.00 | 1.1 | 1.06 |
| Resistance to exudation | ○ | X: | X: | X: | ○ | ○ |
| Chemical resistance (including sebum) | (++) | −− | − | + | ++ | − |
| Resistance to stains/to soiling | (++) | − | − | − | ++ | − |
| "Peachskin" feel | 5 | 1 | 1 | 1 | 4 | 3 |
| Mechanical properties | | | | | | |
| Hardness, instantaneous (Shore A) | <80 | 77 | 85 | 90 | 80 | 75 |
| Hardness, 15 s (Shore A) | <75 | 74 | 80 | 89 | 79 | 72 |
| Tensile test, stress at 25% strain (MPa) | <2.0 | | | | 2.6 | 1.7 |
| Tensile test, stress at 100% strain (MPa) | <4.0 | | | | 4.2 | 3.0 |
| Tensile test, breaking stress (MPa) | >10 | 32 | 39 | 40 | >10 | >10 |
| Tensile test, elongation at break (%) | >500 | >750 | >600 | >450 | >500 | >500 |
| Flexural modulus (MPa) | < or = 12 | 12 | 21 | 77 | 23 | 9 |
| Tear strength (kN/m) | >40 | 66 | 78 | 116 | 47 | 45 |
| Taber abrasion resistance - H18 grinding wheel (weight loss in mg/1000 revolutions) | <50 | 99 | 77 | 62 | 33 | 7 |
| Taber abrasion resistance - CS10 grinding wheel (weight loss in mg/1000 revolutions) | <50 | | | | | |

TABLE 1-continued

Target values sought by the invention and results of measurement of the properties measured on dumbbells (plaques or bars) with compositions A to I

| | | | | | | |
|---|---|---|---|---|---|---|
| Compressive residual strain at 23° C. (%) | <20 | 19 | 22 | 32 | 19 | 18 |
| Compressive residual strain at 70° C. (%) | | 62 | 54 | 21 | 70 | 69 |
| Ease of processing | | | | | | |
| Melt Flow Index at 235° C., 1 kg (g/10 min) | >10 | 10 | 8 | 5 | | |
| Ease of injection | ○ | ○ | ○ | ○ | X | ○ |
| Ease of removal from the mold | ○ | X | X | ○ | ○ | ○ |
| Recyclability | ○ | ○ | ○ | ○ | X | ○ |

The protocols for measuring the properties characterized according to the present invention and measured according to the examples are described in Table 2 below:

TABLE 2

Methods and standards for measurement of the properties

| Property measured | Standard/method | Specifications |
|---|---|---|
| Density | ISO 1183-3 | Measured at 23° C. |
| Resistance to exudation | Internal method | Measured after conditioning in a Blinder container at 70° C. and 62% relative humidity (RH) for 7 days. The samples were 100 × 100 × 2 mm plaques.<br>Classification by visual observation:<br>O = No exudation<br>X = Exudation at the surface |
| Resistance to stains/to soiling | Internal method | Measured after conditioning in an oven at 23° C. and 50% RH for 7 days. The change in color is evaluated by measurement of the chromatic aberration before and after exposure to chemicals and everyday products, generating a Delta E value. The samples are 100 × 100 × 2 mm plaques.<br>Classification by visual observation<br>0 = No change in color at the surface<br>2 = Slight change in color at the surface<br>5 = Significant coloration at the surface |
| Chemical resistance to sebum | Internal method | Measured after conditioning in an oven at 23° C. and 50% RH for 7 days. A given weight of sebum is spread at the surface of the samples and then removed after conditioning. The samples thus exposed are weighed after cleaning and the uptake in weight (%) of the sample during the test is calculated. The possible visual changes are also recorded. The samples are 50 × 50 × 2 mm plaques.<br>Classification scale:<br>(++) = low uptake in weight, no visual changes<br>(+) = low uptake in weight, slight visual changes<br>(−) = high uptake in weight, slight visual changes |
| "Peachskin" feel | Internal method | The feel was evaluated by a trained sensory panel made up of 10 people, on a scale ranging from 1 to 5. On this scale, "1" represents inferior properties of feel (no "peachskin" sensation), while "5" represents superior properties of "peachskin feel".<br>Soft-silky feel or "peachskin" feel: Definition: Characterizes a velvety effect to the touch, such as the velvety skin of the peach.<br>Protocol: Take a sample and make small movements at the surface of the sample with the fingers without pressure.<br>Evaluation: Note the velvety sensation or "peachskin" feel. |
| Hardness | ISO 868 | 23° C. |
| Tensile test | ISO527 | 50 mm/min at 23° C. |
| Flexural modulus | ISO 178 | 23° C. |
| Tear strength | ISO 34-B | 500 mm/min, unnotched samples |

TABLE 2-continued

| Methods and standards for measurement of the properties | | |
|---|---|---|
| Property measured | Standard/method | Specifications |
| Taber abrasion resistance | ISO 9352 | 1000 g load, CS10 abrasive grinding wheel, 1000 revolutions per cycle. The samples are 100 × 100 × 2 mm plaques. |
| Compressive residual strain | ISO 815 | Constant strain of 25% applied for 72 hours at 23° C. or for 22 hours at 70° C. Measurement of the residual strain after 24 h of relaxation. The samples are type B cylinders. |
| Melt Flow Index (MFI) | ISO 1133 | 235° C., 1 kg |
| Ease of injection | Internal method | Classification according to:<br>O = high-speed thin part injection molding without deformation of the final object<br>X = high-speed thin part injection molding which exhibits deformations or defects in surface appearance |
| Ease of removal from the mold | Internal method | Classification according to:<br>O = easy removal from the mold, no sticking<br>X = difficult removal from the mold, sticky material |
| Recyclability | Internal method | The recyclability is defined as the possibility of reprocessing an already molded component, by melting and again molding the material, without impacting the quality of the reprocessed component.<br>Classification according to:<br>X = nonrecyclable<br>O = recyclable |

The characterizations are carried out on samples conditioned at 23° C., 50% relative humidity, for 2 weeks.

The compositions of the invention exhibit a low Shore A hardness, especially formulations A and B, exhibiting a Shore A hardness of less than or equal to 70 after 15 s, while retaining good transformability in injection molding, and no exudation. These formulations show the haptic properties required by mass consumption applications, such as sports devices, portable devices, for example in items of electronic equipment, or optical accessories, such as glasses.

The compositions of the invention also combine a low flexural modulus while retaining very good transformability in injection molding and no exudation, as well as good resistance to high temperatures.

The compositions of the invention, in the composition B comprising a maleated SEBS compatibilizer, exhibit a better abrasion resistance than the PEBA materials and than the TPSiV® products resulting from TPU. The surface characteristics after abrasion are improved: the surface remains smooth and homogeneous without deep scratches. The visual appearance is retained after abrasion, and there is no risk of injury on contact with the skin, which is necessary for the materials used in footwear components, such as footwear heels, for example, or for sports equipment.

The formulations of the invention are a solution for avoiding the bonding stage necessary today to adhesively bond the thermosetting rubber outer sole to the thermoplastic components of the ski boot. This bonding stage takes time, requires the use of primer and adhesive which may contain solvents, and requires a crosslinking stage at high temperature.

On the contrary, the formulations of the invention can be combined directly with the thermoplastics used in ski boots, such as PEBA or TPU.

The compositions of the invention have a more mat surface and a softer feel than the PEBA reference materials.

The compositions of the invention do not exhibit visible exudation, unlike PEBAs.

The compositions of the invention have a lower absorption of moisture than the PEBA reference materials. This contributes to giving a greater resistance to stains, especially toward hydrophilic stains (coffee, tea, wine, and the like).

The compositions of the invention have a lower compressive residual strain compared with PEBAs (comparative examples E, F and G) and with TPSiV® (H) resulting from TPUs, especially at 70° C. This contributes to obtaining better performance qualities under stress, for example in sports equipment or industrial applications, such as sealants.

It has been observed that soft PEBA materials (typical materials with a hardness of less than 35 Shore D) are difficult to injection mold because they tend to stick to the mold and to deform during removal from the mold. The composition (comprising silicone) of the invention is a solution for solving this injection-molding problem while retaining the various advantageous properties of PEBAs, this being the case for materials which are even more flexible.

In addition, when the design of the mold becomes complex, the standard PEBA cannot be injected (because of its stiffness), while there is no problem in injecting the composition (PEBA-silicone) according to the invention.

The invention claimed is:

1. A composition comprising:

(A) a block copolymer having rigid blocks and flexible blocks (TPE), and (B) a non-crosslinked polysiloxane silicone, wherein the non-crosslinked polyorganosiloxane has a poly(organo)siloxane backbone, 5% to 45% of (C) a compatibilizer, improving the compatibility between the TPE and the silicone, chosen from a polyolefin or a mixture of polyolefins, and wherein the polyolefin or the mixture of polyolefins of the compatibilizer (C) carries a functional group chosen from maleic anhydride, carboxylic acid, carboxylic anhydride, and epoxide, wherein the non-crosslinked polysiloxane silicone is non-crosslinkable, the composition comprising, by weight:

from 55% to 95% of copolymer (A), from 5% to 45% of silicone (B), from 5% to 45% of compatibilizer (C), optionally, from 0% to 15% of at least one additive (D), with regard to the total weight of the composition, this being 100%.

2. The composition as claimed in claim 1, wherein said rigid blocks comprise at least one block chosen from: polyamide, polyurethane, polyester, and their copolymers.

3. The composition as claimed in claim 2, wherein the polyamide blocks in the block copolymer (A) are PA 11 and/or PA 12 blocks.

4. The composition as claimed in claim 1, wherein said flexible blocks comprise at least one block chosen from: polyether, polyester, polysiloxane, polyolefin, polycarbonate, and their copolymers.

5. The composition as claimed in claim 1, wherein the block copolymer is chosen from copolymers having polyester blocks and polyether blocks, copolymers having polyurethane blocks and polyether blocks and copolymers having polyamide blocks and polyether blocks.

6. The composition as claimed in claim 1, wherein the flexible blocks in the copolymer (A) are polyether blocks chosen from PTMG, PPG, PO3G and/or PEG.

7. The composition as claimed in claim 1, wherein the number-average molar mass Mn of the flexible blocks, is greater than 800 g/mol.

8. The composition as claimed in claim 1, additionally comprising at least one additive (D) selected from the group consisting of: organic or inorganic fillers, reinforcing agents, plasticizers, stabilizers, antioxidants, UV stabilizers, flame retardants, carbon black, carbon nanotubes, pigments, dyes, mold-release agents, lubricants, foaming agents, impact-resistant agents, flame retardants, nucleating agents, surface-modifying agents and their mixtures.

9. A process for the manufacture of the composition as claimed in claim 1, comprising the step of mixing the block copolymer (A), the non-crosslinked silicone (B), and the compatibilizer (C).

10. The process as claimed in claim 9, wherein the mixing is carried out in a device for mixing in the molten state, at a temperature of the 150° C. to 250° C.

11. An article comprising at least one part comprising the composition as claimed in claim 1.

12. The article as claimed in claim 11, wherein said article is manufactured by a process involving at least one of the following stages: injection molding, overmolding, extrusion, or co-extrusion.

13. The article as claimed in claim 11, wherein said article is selected from the group consisting of a footwear sole, a sports footwear sole, an insole, midsole or outer sole, a ski boot liner, a sock, a racket, an inflatable ball, a solid ball, a floater, gloves, personal protection equipment, a helmet, a rail foot, a motor vehicle part, a pushchair part, a tire, a wheel, a smooth-riding wheel, a tire, a handle, a seat element, a child car seat part, a construction part, an electrical and/or electronic equipment part, an electronic protection part, an audio equipment, acoustic insulation and/or heat insulation part, a part targeted at dampening impacts and/or vibrations, an article of transport, a padding element, a toy, a medical object, a splint, an orthosis, a cervical collar, a dressing, an antimicrobial foam dressing, an art or handicraft object, a life jacket, a backpack, a membrane, a carpet, a sports mat, a sports floor covering, a carpet underlay, and any article comprising a mixture of these articles.

14. The article as claimed in claim 11, the article being selected from the group consisting of:

an article or article element of footwear;

an optical article or optical article element;

an automotive article or automotive article element;

an article or article element used in manufacturing industry;

a medical article or medical article element; and an electronic article or electronic article element.

15. The article as claimed in claim 11, the article being an electrical or electronic article comprising a casing or protective casing, a portable telephone, or a tablet.

16. The composition as claimed in claim 1, the poly(organo)siloxane backbone having a polar functional group present at least at one of its ends.

17. The composition as claimed in claim 16, wherein the polar functional group is selected from the group consisting of a hydroxyl, an urea, an amine, an amide, a carboxylate, an ester, an acrylate, a thiol, a sulfonate, a sulfate and phosphate group.

18. The composition as claimed in claim 1, wherein the compatibilizer is a polymer exhibiting a flexural modulus of less than 100 MPa, measured according to the standard ISO 178, and a Tg of less than 0° C., measured according to the standard 11357-2 at the inflection point of the DSC thermogram.

19. The composition as claimed in claim 1, wherein the compatibilizer is chosen from the following copolymers, grafted with maleic anhydride or glycidyl methacrylate, in which the degree of grafting is from 0.01% to 5% by weight:

ethylene/octene copolymer, ethylene/butene copolymers, ethylene/propylene elastomers (EPR), ethylene-propylene-diene copolymers with an elastomeric nature (EPDM), ethylene/(meth)acrylate copolymers, and ethylene/butylene-styrene (SEBS) copolymer.

20. The composition as claimed in claim 1, wherein the compatibilizer is a ethylene/propylene copolymer, predominant in propylene, grafted by maleic anhydride and then condensed with monoaminated polyamide or a polyamide oligomer.

21. The composition as claimed in claim 1, wherein the compatibilizer is an ethylene copolymer, where ethylene represents at least 60% by weight and where the functional group represents from 0.1% to 10% by weight of the copolymer.

22. The composition as claimed in claim 1, wherein the composition has a Shore A hardness, 15 s, of less than 75.

23. The composition as claimed in claim 1, wherein the composition has a Shore A hardness, 15 s, of less than 70.

24. The composition as claimed in claim 1, wherein the ratio by weight of the rigid blocks, to the flexible blocks, in the copolymer (A) is less than or equal to 1.2.

* * * * *